April 20, 1965   S. O. LINDERHOLM   3,178,799
METHOD FOR MANUFACTURING CAPACITORS
Original Filed Nov. 3, 1959

INVENTOR.
SVEN O. LINDERHOLM
BY
ATTORNEY

United States Patent Office 3,178,799
Patented Apr. 20, 1965

3,178,799
METHOD FOR MANUFACTURING CAPACITORS
Sven O. Linderholm, Barberton, Ohio, assignor to The Ohio Brass Company, Mansfield, Ohio, a corporation of New Jersey
Original application Nov. 3, 1959, Ser. No. 45,253. Divided and this application Mar. 4, 1963, Ser. No. 265,000
3 Claims. (Cl. 29—25.42)

This is a division of application Serial No. 45,253, filed November 3, 1959.

This invention relates to capacitors and, more particularly, to grading capacitors and high voltage capacitors.

It is known in the electrical art to use capacitors for grading electrical stresses in potheads and bushings. For such purposes, it is also known to utilize capacitors having multiple overlapping foils for increased utilization of the dielectric material and for producing desired capacitance and voltage withstand for prescribed physical dimensions. With such arrangements, shunt connections have been employed between the ends of the individual foils in order to reduce the inductance of the capacitor.

I have devised and describe herein an improved capacitor of the type just referred to, but one incorporating a greatly simplified arrangement of the shunt connections between the foils. The arrangement is such that significant economies in the manufacture of the capacitor are possible.

The principal object of the invention is to simplify and improve the manufacture of non-inductive capacitors.

It is a general purpose of the invention to provide improved capacitors useful for voltage division and potential grading functions.

The invention, together with further objects, features and advantages thereof, will be more fully understood by reference to the following detailed specification and claims, taken in connection with the appended drawings, in which FIG. 1 is a side elevation view of the capacitor of the invention;

Figure 1:
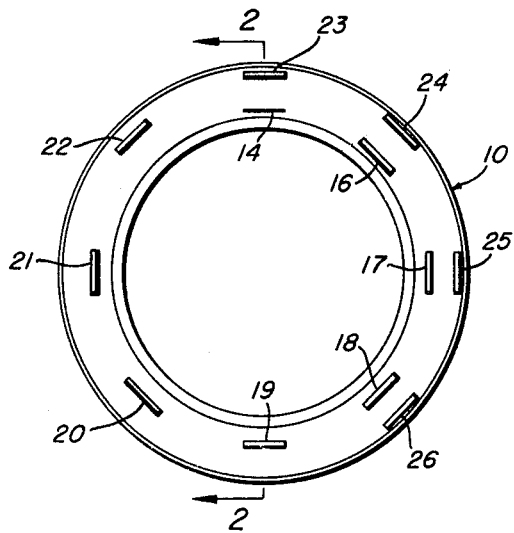
Figure 2:
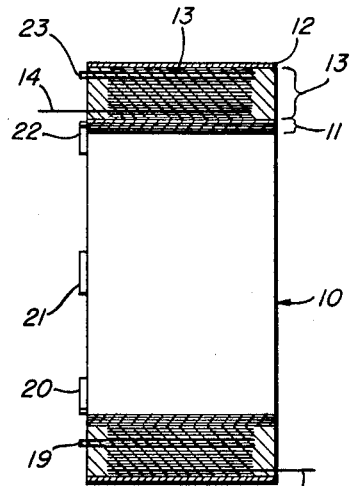
FIG. 2 is a sectional view of the capacitor of FIG. 1, taken in the direction 2—2.

As shown in FIGS. 1 and 2, the capacitor 10 is in generally annular form constituted by a cylindrical roll of foil and paper. The inner part of the capacitor, indicated at 11, is a paper tube or other core for supporting the capacitor, and the outer part, indicated at 12, is a winding of paper or the like for protecting the capacitor. The central part of the capacitor, designated at 13, is a continuous winding of a multi-layer of foil and paper.

Connections are made to the foils of the multi-layer by means of narrow strips of metallic material such as foil, referred to herein as tabs, which extend into the multi-layer to contact the foils thereof. Two tabs 14 and 15 are connected to the foils at the inner and outer extremities of the multi-layer which forms the central part 13 of the capacitor. Other tabs 16 to 26, inclusive, extend from between the foil and paper of the multi-layer to the exterior of the winding, in a radial direction, and back between the foil and paper to interconnect separate foils which function as armatures for the capacitor. The interconnection of the foils serves to reduce the inductance of the capacitor, as is hereinafter described.

The capacitor 10 is utilized as a grading capacitor in terminating devices such as potheads, and the inner radius of the capacitor is such that the capacitor may be received over the core of the pothead.

Figure 3:
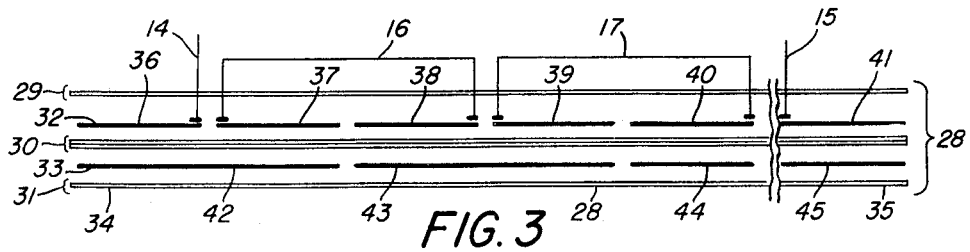
FIG. 3 is a schematic diagram, in longitudinal development, showing the foil arrangement of the capacitor of FIG. 1 according to one embodiment of the invention.

In FIG. 3 the foil and paper multi-layer 28 is shown in longitudinal section, with the individual layers in somewhat schematic form and spaced apart for convenience of illustration and description. The several layers 29 to 33 of the multi-layer 28 are wound together in tightly superimposed and interleaved relationship to constitute the capacitor 10 of FIG. 1, as is known in the art pertaining to rolled capacitors. The one end of the multi-layer 28, referred to as the inner end of the multi-layer, is designated by the numeral 34, whereas the remaining end of the multi-layer, referred to as the outer end of the multi-layer, is designated by the numeral 35.

The layers 29, 30 and 31 are each constituted by one or more sheets of paper, preferably in continuous strips for convenience of winding. The layers 29 and 31 are designated as insulating layers or layers of insulating paper inasmuch as the paper functions to insulate the foils of successive turns each from the other. The layer 30 is designated as a dielectric layer or layer of dielectric paper inasmuch as the paper functions as a dielectric medium between the two foil layers in the utilization of the device as a capacitor. The paper has suitable insulating and dielectric properties, such as a high density capacitor paper known in the art.

The layers 32 and 33 are designated as foil layers, each layer being constituted by a plurality of sheets of metallic foil, or foils, which are opposed with respect to the dielectric layer 30 to constitute the armatures of a plurality of interconnected capacitors. The layer 32 comprises a succession of foils 36, 37, 38, 39 and 40 and 41 of substantially the same length and having a predetermined spacing between the adjacent ends of successive foils. The layer 33 comprises a succession of foils 42, 43, and 44 and 45 arranged between the adjacent papers of the dielectric layer 30 and the insulating layer 31 and opposite the foils 36 and 37, 38 and 39, and 40 and 41, respectively.

The foils of the foil layer 33, in each instance, are associated with two foils of the foil layer 32. For example, the foil 42 extends for the length of the foils 36 and 37 along the dielectric layer 30 on the opposite side of that layer from the foils 36 and 37. The two halves of the foil 42 cooperate as capacitor armatures with the foils 36 and 37. However, since the foil 42 is in one piece, the armatures constituted by the foil 42 are connected electrically in series and the two capacitors formed by the foils 36 and 42 and 42 and 37 are also connected in series. These foils, referred to herein as a foil group, and the successive foils of the foil layers 32 and 33 are arranged into successive foil groups, each incorporating the same arrangement of foils.

The successive foil groups, just referred to, are connected in series by the tabs 16 to 26. Thus in FIG. 3 the tab 16 connects the inner end of the foil 37 to the outer end of the foil 38 so that the capacitors constituted by the foil groups 36, 42, 37 and 38, 43, 39, respectively, are connected in series. Similarly, the tab 17 connects the inner end of the foil 39 and the outer end of the foil 40 to connect the capacitors constituted by the foil groups 38, 43, 39 and 40, and 44 in series. The remaining foil associated with the foils 40 and 44 is not shown, the foils 41 and 45 constituting the final foils at the outer end 35 of the multi-layer.

As shown, particularly in FIGS. 1 and 2, each of the tabs 16 to 26 is constituted by a strip of sheet conducting material, such as a metallic foil formed of somewhat heavier material than, or several layers of the same material as, the foils 36 to 45. In each instance of the tabs contact the end of the foil along the width of the tab and along the transverse or longitudinal dimension of the foil and extend outwardly and radially about the intervening papers and inwardly to contact the associated foil. The length of the foils is determined with respect to the circumference so that the corresponding extremities of the foils which are interconnected by the tabs are disposed in radially overlapping relationship.

The terminal tabs 14 and 15 are arranged to contact the outer end of the foil 36 and the inner end of the foil 41, respectively. However, the tab 14 extends in one direction and the tab 15 in the opposite direction from the winding. The capacitor 10 is usually associated with other capacitors of the same kind by stacking along the longitudinal axis and this arrangement of the terminal tabs facilitates interconnection of the several capacitors.

With the arrangement of foils shown, the flow of charging current in one direction in the foils of the layer 32 is paralleled by a flow in the opposite direction of the charging current in the associated foil of the layer 33. Accordingly, the net magnetic field produced by the flow of current to and from the capacitor and the inductive effect of the windings is of a very low order of magnitude.

Because of the rolled arrangement of the winding, it will be understood that the layers 29 and 31 of the insulating paper may be combined into a single layer. Winding and tab insertion may be facilitated, for example, by omitting the layer corresponding to the layer 29 and utilizing only a layer 31 of appropriate insulating strength. Thus, in the exemplary embodiment of the invention, referred to hereinafter, only the layers 30 and 31 of insulating paper were used, each constituted by seven layers of kraft capacitor paper.

Manufacture is advantageously accomplished by means of a winding machine in which the foils and papers are carried as continuous strips on a plurality of spools. The capacitor is wound upon the inner part or core 11 which is carried upon an electrically driven spindle. In winding, the ends of the paper strips which form the layers 29, 30 and 31 or the layers 30 and 31, as the case may be, are attached to the part 11 and a sufficient number of turns wound to provide a secure anchorage thereupon. The ends of the foil strips which form the foil layers 32 and 33 are then inserted on opposite sides of the paper strips which form the layer 30, and the winding continued until the foil strip of the layer 32 has reached a predetermined length to constitute the foil 36. The foil strip is then cut and the tab 14 inserted between the foil 36 and the paper of the layer 29, adjacent the outer end of the foil.

The winding is then continued through a predetermined distance, corresponding to the spacing between the adjacent ends of the foils 36 and 37, whereupon the foil strip of the layer 32 is again inserted between the papers of the layers 29 and 30, with one end of the tab 16 in contact with the foil 37, adjacent the inner end. After a predetermined distance, both foil strips are cut to complete the foils 37 and 42, and winding is then continued. Again, after a predetermined distance, the foil strips are started to form the foils 38 and 43 and the winding is continued until the foil 38 is of the correct length. The foil strip is then cut and the tab 16 reinserted between the layers 30 and 32 to contact the foil 38 adjacent the outer end of the foil. The process is repeated until the foil 41 has been started and tab 15 inserted from the side of the capacitor opposite to the tab 14 to contact the inner end of the foil 41. The foil strips are then cut to form the foils 41 and 45 and winding is then continued with only the paper layers to form the outer part 12 of the capacitor. The final turns of paper are then secured in place. The final winding may be varnished, impregnated, or otherwise prepared for the intended use.

Since the metallic strips which constitute the tabs 16 to 26 are always inserted between the paper and the foil from the same side of the winding and are always inserted in identical positions, e.g., in contact with the foils of the layer 32, the interconnection of the foils may be accomplished with a relatively small probability of error. Because of the simplicity and consistency of these manufacturing operations, the mistakes and consequent delays of the prior practices are substantially eliminated.

Figure 4:
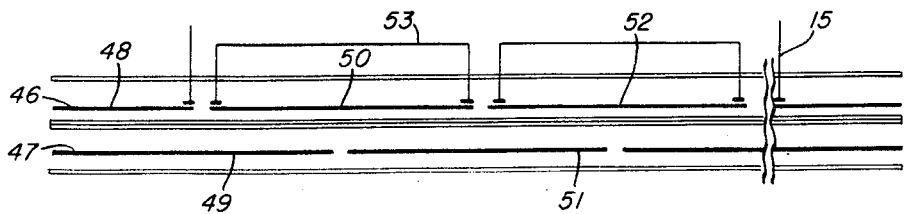
FIG. 4 is a schematic diagram similar to that of FIG. 3 illustrating the foil arrangement of the capacitor according to another embodiment of the invention.

In the embodiment of the invention shown in FIG. 4, the winding is simplified by utilizing a single foil in the foil layer 46 in adjacent groups of foils. As shown, interconnection of the foil groups, constituted by the foils 48, 49 and 50 and 50, 51 and 52, is accomplished by the tab 53. The common foil 50 serves as another connection between the capacitor groups parallel to the tab 53. However, analysis indicates that no current flows in the central portion of the foil 50, e.g., the portion corresponding to adjacent portions of the foils 37 and 38 in FIG. 3, and tests indicate that inductance of the capacitor of FIG. 4 does not differ appreciably from that of the capacitor of FIG. 3.

The arrangement of FIG. 4 has some advantage, from the standpoint of simplicity of manufacture, inasmuch as the cutting and spacing operations are performed upon only one foil at a time. Thus the foils 48 and 50 are first formed by cutting and spacing the foil strip of the layer 46; next the foils 49 and 51 are formed by cutting and spacing the foil strip of the layer 47; then the foils 50 and 52 of the layer 46, and so on. Moreover, the fact that the several foils of the two layers, e.g., the foils 48 and 49 and the foils 50 and 51, are of the same length reduces the possibility of error both in engineering and during manufacture.

A grading capacitor embodying the foil arrangement of FIG. 4 in six foil groups and having a nominal capacitance of .0065 microfarad displayed a natural resonance frequency of 1890 kc./s. by impulse test. The same capacitor in which the tabs were omited displayed a natural resonance frequency of 75.2 kc./s. Having in mind the importance of low inductance in grading capacitors under transient conditions, it is apparent that a very large improvement in result is achieved with a comparatively simple and inexpensive capacitor construction.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. That method of manufacturing a rolled capacitor in which successive first armature foils on one side of a layer of dielectric paper are opposed by successive second armature foils on the remaining side of the dielectric paper which comprises winding a multi-layer constituted by continuous strips of paper and interspersed continuous first and second foil strips, cutting the first of the said foil strips to constitute a first one of the said first armature foils, inserting a tab from one side of the strips to contact the adjacent end of the said first foil, continuing the winding and then inserting the said first foil strip to initiate a second foil of the said first armature foils spaced from the said first foil, inserting a tab from said one side of the strips to contact the end of the said second foil, continuing the winding and then cutting both of the said foil strips to constitute a second one of the said first armature foils and a first one of the said first armature foils.

2. That method of manufacturing a rolled capacitor in which successive pairs of first armature foils on one side of a layer of dielectric paper are opposed by successive single second armature foils on the remaining side of the dielectric paper which comprises winding a multi-layer constituted by continuous strips of paper and interspersed continuous first and second foil strips, cutting the first of the said foil strips to constitute a first one of the said first armature foils, inserting a tab from one side of the strips to contact the adjacent end of the said first foil, continuing the winding and then inserting the said first foil strip to initiate a second foil of the said first armature foils spaced from the said first foil, inserting a tab from the said one side of the strips to contact the end of the said second foil, continuing the winding and then cutting both of the said foil strips to constitute a second one of the said first armature foils and a first one of the said first armature foils, continuing the winding and then re-inserting both foil strips to initiate succeeding first and second armature foils and then continuing winding with continued cutting and spacing alternatively the first and then both foil strips and inserting tabs from the said one side of the strips to contact the adjacent ends of the said first armature foils.

3. That method of manufacturing a rolled capacitor in which successive first armature foils on one side of a layer of dielectric paper are opposed by successive second armature foils on the remaining side of the dielectric paper which compromises winding a multi-layer constituted by continuous strips of paper and interspersed continuous first and second foil strips, cutting the first of the said foil strips to constitute a first one of the said first armature foils, inserting a tab from one side of the strips to contact the adjacent end of the said first foil, continuing the winding and then inserting the said first foil strip to initiate a second foil of the said first armature foil spaced from the said first foil, inserting a tab from the said one side of the strips to contact the end of the said second foil, continuing the winding and then cutting the second foil strip to constitute a first one of the said first armature foils, continuing the winding and then re-inserting the second foil strip to initiate a succeeding second armature foil, and then continuing winding with cutting and spacing alternately the first and then the other foil strip and inserting tabs to contact the adjacent ends only of the first armature foils.

No references cited.

RICHARD H. EANES, JR., *Primary Examiner.*